(12) United States Patent
Pearce et al.

(10) Patent No.: US 8,644,007 B2
(45) Date of Patent: Feb. 4, 2014

(54) ELECTRICAL SWITCHING APPARATUS, AND RACKING ASSEMBLY AND SECONDARY DISCONNECT ASSEMBLY THEREFOR

(75) Inventors: Michael Davis Pearce, Plum Branch, SC (US); Michael Howard Abrahamsen, Greenwood, SC (US); Jon Christopher Beaver, Greenwood, SC (US); Melvin Lavern Hughes, Winterville, GA (US)

(73) Assignee: Eaton Corporation, Cleveland, OH (US)

( * ) Notice: Subject to any disclaimer, the term of this patent is extended or adjusted under 35 U.S.C. 154(b) by 397 days.

(21) Appl. No.: 13/031,362

(22) Filed: Feb. 21, 2011

(65) Prior Publication Data
US 2012/0211335 A1 Aug. 23, 2012

(51) Int. Cl.
*H02B 1/00* (2006.01)
(52) U.S. Cl.
USPC ...... 361/610; 361/673; 200/50.24; 200/50.26
(58) Field of Classification Search
USPC ......... 361/601, 609, 610, 615, 627, 632, 635, 361/652–654, 673, 825, 829
See application file for complete search history.

(56) References Cited

U.S. PATENT DOCUMENTS

| | | | |
|---|---|---|---|
| 5,278,722 A | 1/1994 | Peruso | |
| 6,177,641 B1 * | 1/2001 | Morel et al. | ............... 200/50.26 |
| 6,205,017 B1 | 3/2001 | Wilkie, II et al. | |
| 7,019,229 B1 | 3/2006 | Weister et al. | |
| 7,486,499 B2 | 2/2009 | Rambo et al. | |
| 7,763,814 B2 | 7/2010 | Kozar et al. | |

* cited by examiner

*Primary Examiner* — Courtney Smith
(74) *Attorney, Agent, or Firm* — Eckert Seamans Cherin & Mellott, LLC; Grant E. Coffield

(57) ABSTRACT

A secondary disconnect assembly is provided for a racking assembly of an electrical switching apparatus, such as a circuit breaker. The racking assembly movably couples the circuit breaker to a switchgear enclosure. The secondary disconnect assembly includes a mounting assembly having an elongated mounting member. The elongated mounting member has first and second opposing ends and first and second opposing sides. A sliding assembly is movably coupled to the first side between the first and second ends. A latching member is pivotably coupled to the sliding assembly. The latching member moves between an unlatched position corresponding to the circuit breaker being movable independently with respect to the sliding assembly, and a latched position corresponding to the latching member fixedly coupling the sliding assembly to the circuit breaker in order that the circuit breaker moves with the sliding assembly. The racking assembly may also include a position indicator.

14 Claims, 6 Drawing Sheets

ELECTRICAL SWITCHING APPARATUS, AND RACKING ASSEMBLY AND SECONDARY DISCONNECT ASSEMBLY THEREFOR

BACKGROUND

1. Field

The disclosed concept relates generally to electrical switching apparatus and, more particularly, to electrical switching apparatus, such as circuit breakers. The disclosed concept also relates to racking assemblies for circuit breakers. The disclosed concept further relates to secondary disconnect assemblies.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of compartments or cells, with each cell being structured to receive a corresponding circuit breaker. The draw-out mechanism (also referred to as the racking assembly) includes, for example, a combination of rails and rollers coupled to one or the other, or both, of the sidewalls of the cell and the sides of the corresponding circuit breaker, which is to be drawn into and out of the cell.

Typically, the racking assembly is coupled to the switchgear enclosure making it difficult to accurately indicate the position of the circuit breaker with respect to the switch gear enclosure compartment. That is, it is difficult to mechanically determine if the circuit breaker is, in fact, actually moving (e.g., into the enclosure cell; out of the enclosure cell) with the racking assembly, as opposed to a portion of the racking assembly moving independently with respect to the circuit breaker and/or enclosure. Additionally, it will be appreciated that the secondary disconnects of some medium voltage circuit breakers, for example, must travel a relatively long distance (e.g., up to 10 inches or more) making automatic operation of the secondary disconnects difficult to achieve.

There is, therefore, room for improvement in electrical switching apparatus, such as circuit breakers, and in racking assemblies and secondary disconnect assemblies therefor.

SUMMARY

These needs and others are met by embodiments of the disclosed concept, which are directed to a secondary disconnect assembly for the racking assembly of an electrical switching apparatus, such as a circuit breaker. Among other benefits, the secondary disconnect assembly combines effective automatic operation and accurate circuit breaker position indication.

As one aspect of the disclosed concept, a secondary disconnect assembly is provided for a racking assembly of an electrical switching apparatus. The racking assembly movably couples the electrical switching apparatus to a switchgear enclosure. The secondary disconnect assembly comprising: a mounting assembly structured to be coupled to the racking assembly, the mounting assembly comprising an elongated mounting member including a first end, a second end disposed opposite and distal from the first end, a first side, and a second side disposed opposite the first side; a sliding assembly movably coupled to the first side between the first end and the second end; and a latching member pivotably coupled to the sliding assembly, the latching member being structured to move between an unlatched position corresponding to the electrical switching apparatus being movable independently with respect to the sliding assembly, and a latched position corresponding to the latching member fixedly coupling the sliding assembly to the electrical switching apparatus in order that the electrical switching apparatus moves with the sliding assembly.

The electrical switching apparatus may include a protrusion, and the latching member may include a cam surface and a recess wherein the cam surface is structured to engage the protrusion, thereby pivoting the latching member toward the latched position and wherein, when the latching member is disposed in the latched position, the recess is structured to receive the protrusion, thereby fixedly coupling the sliding assembly to the electrical switching apparatus. The mounting assembly may further comprise a lever member pivotably coupled to the elongated mounting member, and the sliding assembly may comprise a locking member. The locking member may include a first portion and a second portion, wherein the first portion cooperates with the latching member and the second portion cooperates with the elongated mounting member. The locking member may be movable between a locked position corresponding to the second portion locking with the elongated mounting member in order that the sliding assembly cannot move with respect to the mounting assembly, and an unlocked position corresponding to the second portion of the locking member disengaging the lever member in order that the sliding assembly is movable with respect to the mounting assembly. The locking member may be disposed in the locked position unless and until the latching member is disposed in the latched position.

The mounting assembly may further comprise a position indicator. The position indicator may be operatively coupled to the lever member. When the latching member is latched and the sliding member and the electrical switching apparatus move, the lever member may be structured to correspondingly move, thereby moving the position indicator to provide a visual indication of the position of electrical switching apparatus with respect to the enclosure. The mounting assembly may further comprise a push-pull cable.

A racking assembly and an electrical switching apparatus, which employ the aforementioned secondary disconnect assembly, are also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, clockwise, counterclockwise, left, right, up, down, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 1:
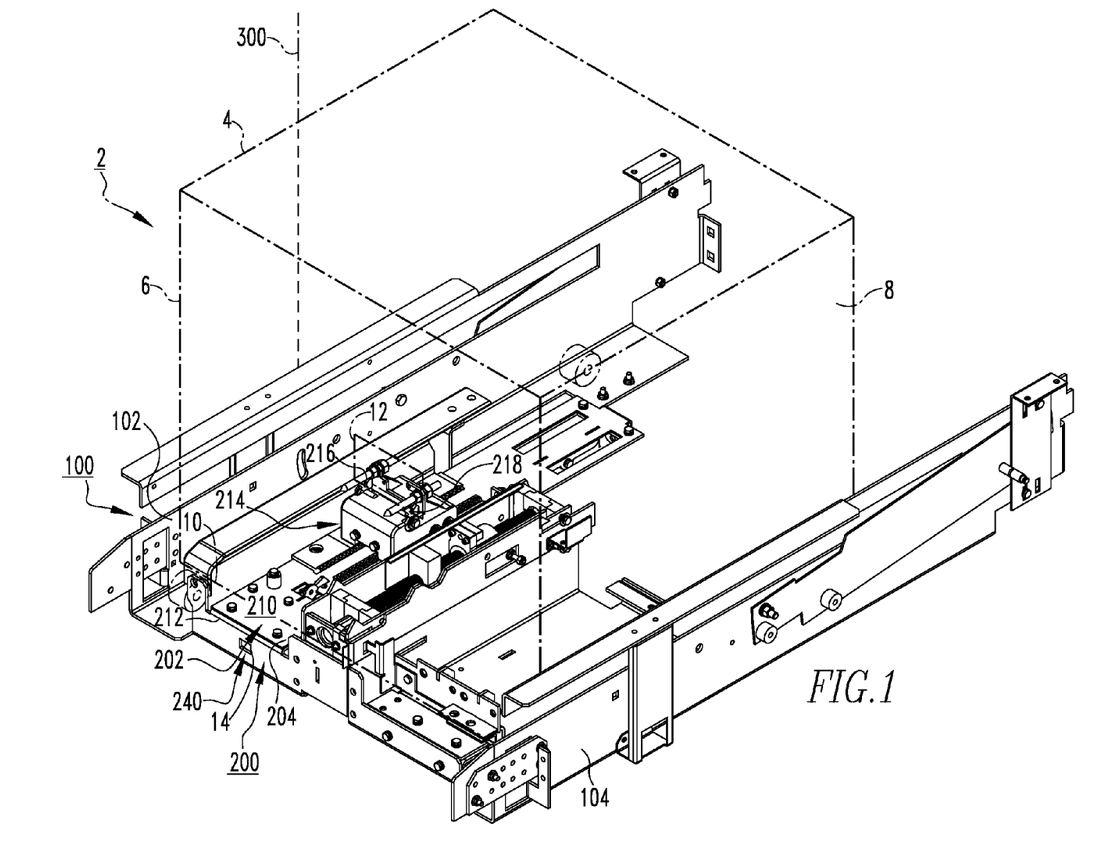
FIG. 1 is an isometric view of a circuit breaker, and racking assembly and secondary disconnect assembly therefor, in accordance with an embodiment of the disclosed concept.

FIG. 1 shows a secondary disconnect assembly 200 for a racking assembly 100 of an electrical switching apparatus such as, for example and without limitation, the draw-out circuit breaker 2 shown in simplified form in phantom line drawing. The racking assembly 100 movably couples the circuit breaker 2 to a switchgear enclosure 300 (partially shown in phantom line drawing in FIG. 1). In the example of FIG. 1, the circuit breaker 2 includes a housing 4 having first and second opposing sides 6,8 and a base 10 extending between the sides 6,8. The racking assembly 100 includes a pair of rails 102,104, which movably couple the sides 6,8 of the circuit breaker 2 to the switchgear enclosure 300.

Figures 2, 3, 8:
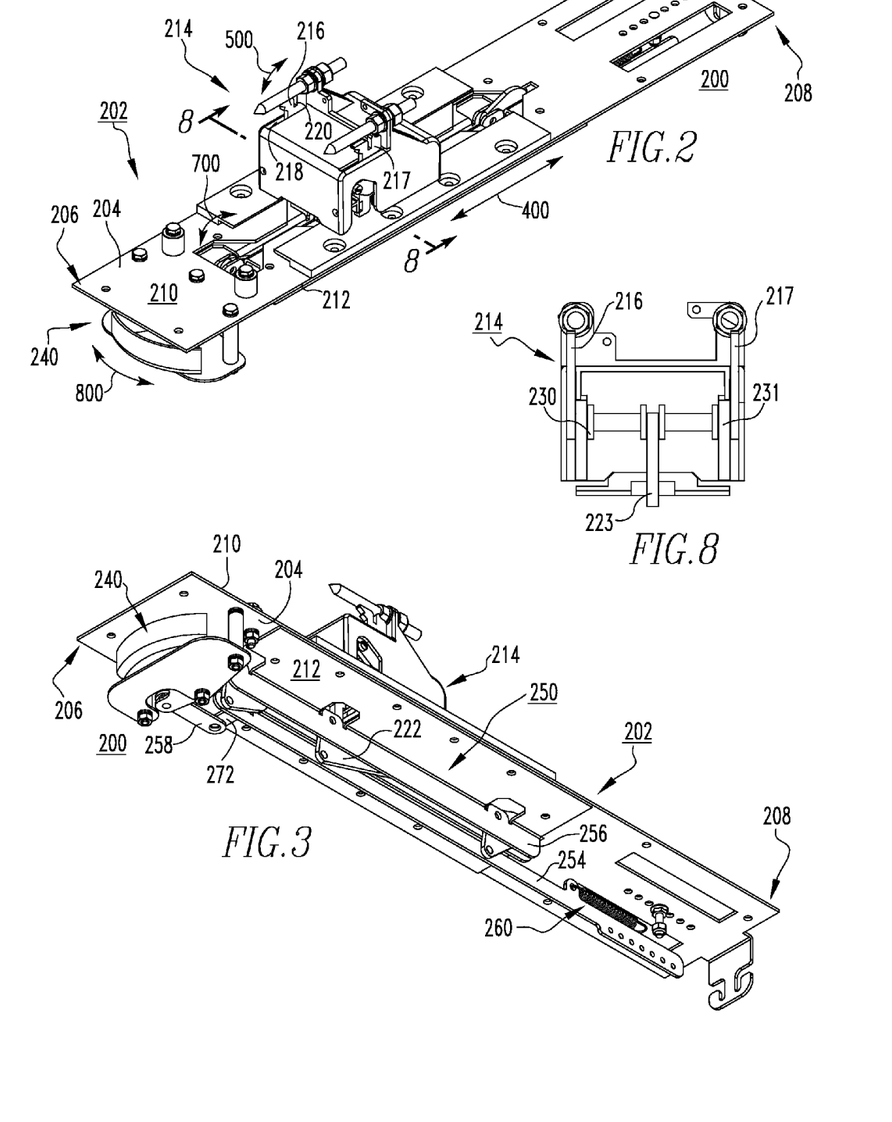
FIG. 2 is a top isometric view of the secondary disconnect assembly of FIG. 1.
FIG. 3 is a bottom isometric view of the secondary disconnect assembly of FIG. 2.
FIG. 8 is a section view taken along line 8-8 of FIG. 2.

Continuing to refer to FIG. 1, and also to FIGS. 2 and 3, it will be appreciated that the secondary disconnect assembly 200 preferably includes a mounting assembly 202. The mounting assembly 202 is coupled to the racking assembly 100, as shown in FIG. 1, and includes an elongated mounting member 204. The elongated mounting member 204 includes a first end 206, a second end 208 disposed opposite and distal from the first end 206, a first side 210, and a second side 212 disposed opposite the first side 210. As best shown in FIG. 2, a sliding assembly 214 is movably coupled to the first side 210 of the elongated mounting member 202, between the first and second ends 206,208 thereof. More specifically, the sliding assembly 214 is structured to move linearly back and forth in the direction of arrow 400 of FIG. 2.

A latching member 216 is pivotably coupled to the sliding assembly 214, and is movable (e.g., clockwise and counter-clockwise in the direction of arrow 500 from the perspective of FIG. 2) between an unlatched position (FIGS. 4A and 4B), corresponding to the circuit breaker 2 (FIG. 1; also partially shown in FIGS. 4B, 5B, 6B and 7B) being movable independently with respect to the sliding assembly 214, and a latched position (FIGS. 1 and 5A-7B), corresponding to the latching member 216 fixedly coupling the sliding assembly 214 to the circuit breaker 2 (FIG. 1; also partially shown in FIGS. 4B, 5B, 6B and 7B), in order that the circuit breaker 2 moves with the sliding assembly 214. In other words, when the latching member 216 is unlatched, the circuit breaker 2 is movable independently with respect to the secondary disconnect assembly 200, as shown in FIG. 4B.

More specifically, the circuit breaker 2 preferably includes a protrusion 12 (shown in phantom line drawing in simplified form in FIG. 1; see also FIGS. 4B, 5B, 6B and 7B), and the latching member 216 includes a cam surface 218 and a recess 220 (best shown in FIGS. 4B, 5B, 6B and 7B). The cam surface 218 is structured to engage the circuit breaker protrusion 12, thereby pivoting the latching member 216 (e.g., counterclockwise in the direction of arrow 500 of FIG. 2) toward the latched position of FIG. 5B (see also FIGS. 6B and 7B). When the latching member 216 is disposed in such latched position, the recess 220 of the latching member 216 receives the circuit breaker protrusion 12, thereby fixedly coupling the sliding assembly 214 to the circuit breaker 2, as shown. Operation of the secondary disconnect assembly 200 and, in particular, movement of the sliding assembly 214 with respect to the mounting assembly 202, will be further described hereinbelow with respect to FIGS. 5A-7B.

Figure 7A:
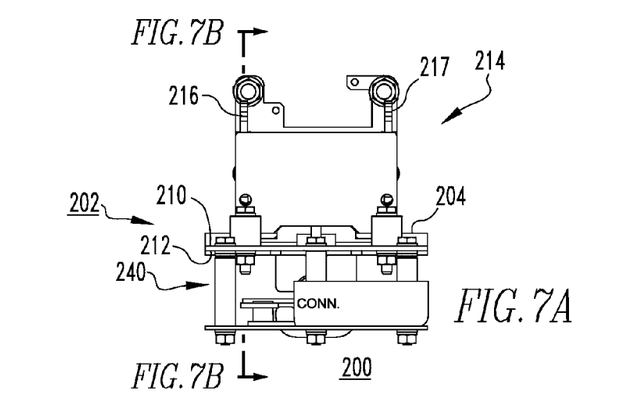
FIG. 7A is an end elevation view of the secondary disconnect assembly of FIG. 6B, corresponding to the circuit breaker being disposed in the connected position.
Figure 7B:
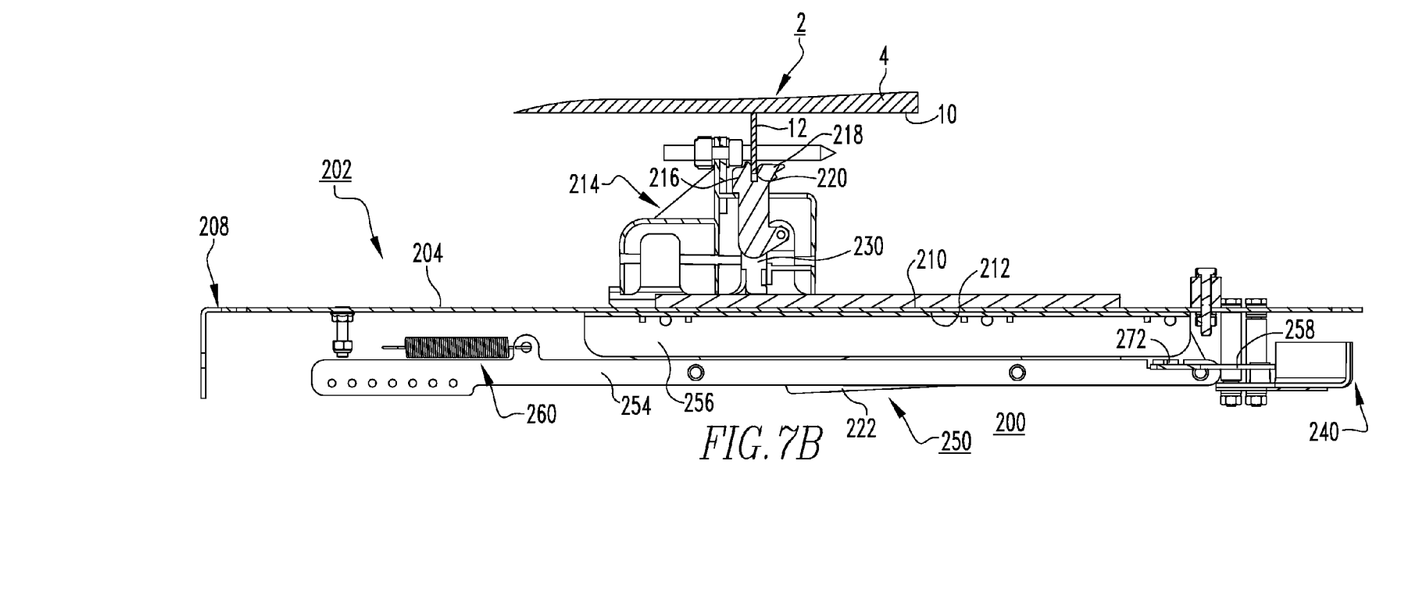
FIG. 7B is a section view taken along line 7B-7B of FIG. 7A.

The example mounting assembly 202 further includes a pivotable lever member 222. The sliding assembly 214 preferably includes at least one locking member 230 (see also locking member 231 of FIG. 8) having a first portion 232, which cooperates with the latching member 216, and a second portion 234, which cooperates with the elongated mounting member 204, as best shown in FIG. 4B. More specifically, the locking members 230,231 (both shown in FIG. 8) in the example shown and described herein are locking pins 230, 231, which are biased towards the locked position shown in FIG. 4B. In operation, the locking members 230,231 are movable between the locked position of FIG. 4B, which corresponds to the second portion 234 locking with the elongated mounting member 204 in order that the sliding assembly 214 cannot move with respect to the mounting assembly 202, and an unlocked position (see, for example, FIGS. 5B and 7B), which corresponds to the second portion 234 of the locking member 230 disengaging the elongated mounting member 204 in order that the sliding assembly 214 is movable with respect to the mounting assembly 202. In other words, the locking member 230 is disposed in the locked position (FIG. 4B) unless and until the latching member 216 is disposed in the latched position (FIGS. 5B, 6B and 7B). Thus, it will be appreciated that when the cam surface 218 of the latching member 216 engages the circuit breaker protrusion 12 and pivots (e.g., counterclockwise in the direction of arrow 500 of FIG. 2), the latching member 216 releases the second portion 232 of the locking member 230 such that the locking member 230 moves upwardly in the direction of arrow 600 of FIG. 5B. This, in turn, results in the second portion 234 of the locking member 230 being released from the elongated mounting member 204. Consequently, the sliding assembly 214 is free to move. The sliding assembly 214 preferably further includes a lever control member or pin 223, as shown in FIG. 8. The lever control member 223 is structured to control movement (e.g., pivoting counterclockwise in the direction of arrow 700 in FIG. 5B) of the pivotable lever 222, in response to movement of the sliding assembly 214. In this manner, the pivotable lever 222 moves (e.g., left and right in the direction of arrow 400 of FIG. 2) a corresponding elongated member 254 of the mounting assembly 202 to accurately move a position indicator 240, as will be described in greater detail hereinbelow.

Figure 4A:
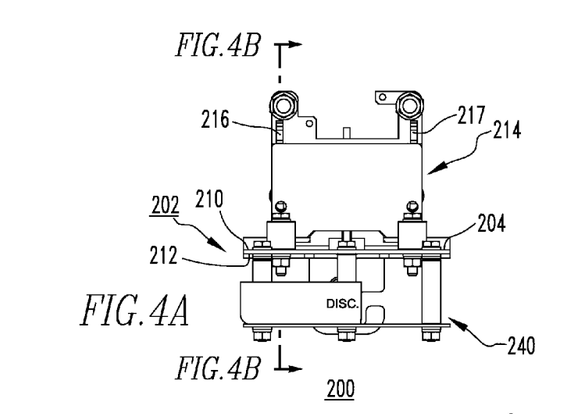
FIG. 4A is an end elevation view of the secondary disconnect assembly of FIG. 3, corresponding to the circuit breaker being disposed in the disconnected position.
Figure 5A:
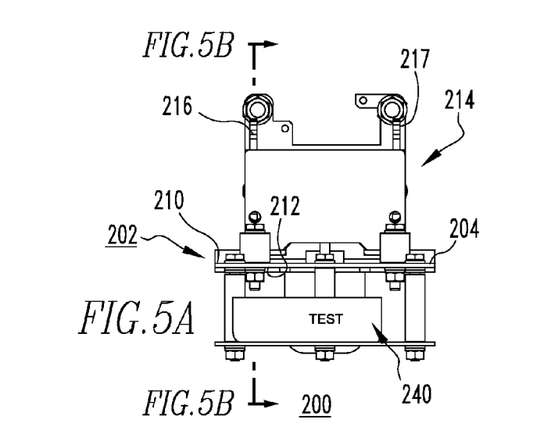
FIG. 5A is an end elevation view of the secondary disconnect assembly of FIG. 4B, corresponding to the circuit breaker being disposed in the test position.
Figure 5B:
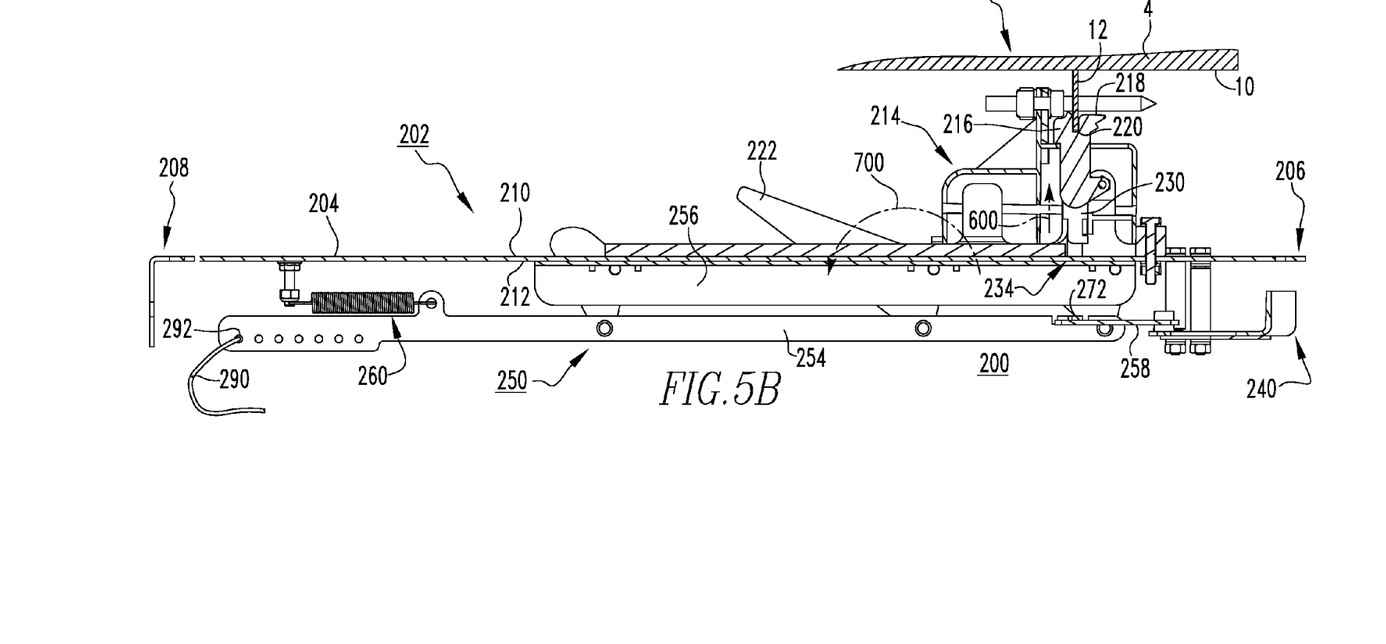
FIG. 5B is a section view taken along line 5B-5B of FIG. 5A.
Figure 6A:
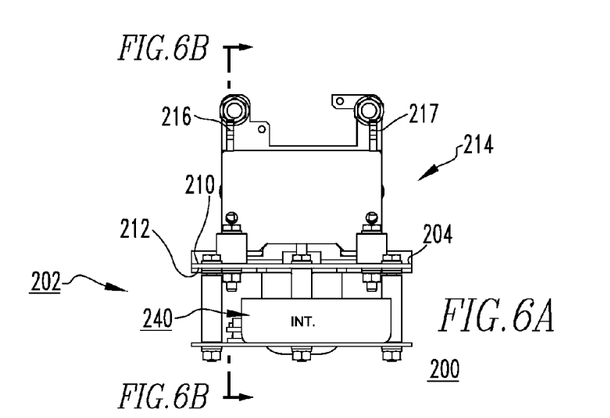
FIG. 6A is an end elevation view of the secondary disconnect assembly of FIG. 5B, corresponding to the circuit breaker being disposed in the intermediate position.
Figure 6B:
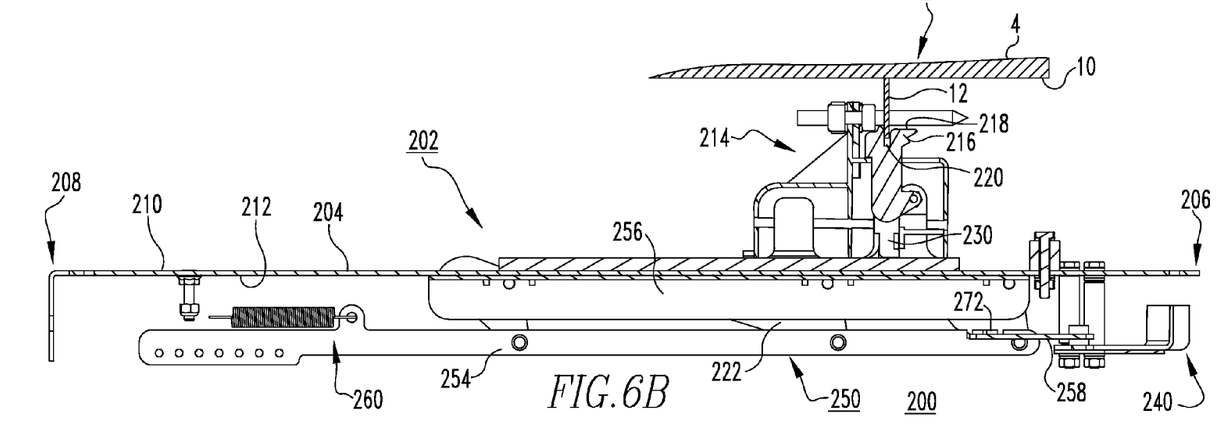
FIG. 6B is a section view taken along line 6B-6B of FIG. 6A.

As shown in the isometric view of FIG. 2 and in FIGS. 4A, 5A, 6A and 7A, the latching member 216 of the example sliding assembly 214 includes a pair of opposing latching members 216,217, which are structured to pivot together to engage and secure the circuit breaker protrusion 12, as shown in FIGS. 5B, 6B and 7B. It will, however, be appreciated that any known or suitable alternative number and/or configuration of latching members (not shown) could be employed without departing from the scope of the disclosed concept.

Figure 4B:
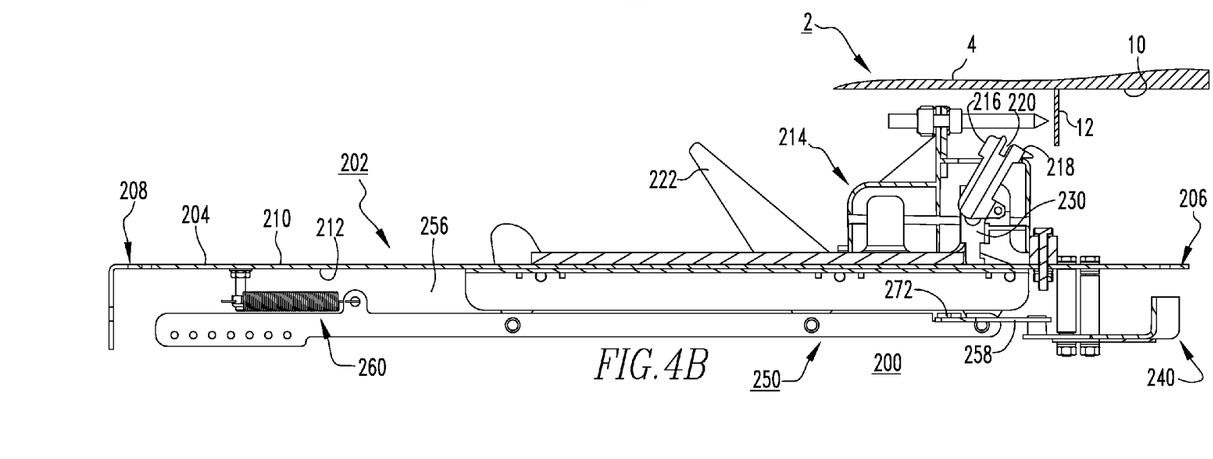
FIG. 4B is a section view taken along line 4B-4B of FIG. 4A.

In view of the foregoing, it will be appreciated that the secondary disconnect assembly 200 is structured to ensure that the secondary disconnect is either locked in place in the disconnected position of FIGS. 4A and 4B (e.g., in the front of a corresponding cell of the switchgear enclosure 300 (FIG. 1)), or it is locked to the circuit breaker 2 and travels with the circuit breaker 2.

As best shown in FIGS. 4A, 5A, 6A and 7A, the example mounting assembly 202 further includes a position indicator 240. In the example shown and described herein, the position indicator is a pivotable member 240 including a visual indicia such as, for example and without limitation, the words or letters "DISC." (see FIG. 4A) corresponding to the disconnected state of the circuit breaker 2, shown in FIG. 4B, the letters "TEST" (FIG. 5A), corresponding to the circuit breaker 2 and secondary disconnect assembly 200 being disposed in the TEST state, shown in FIG. 5B, the letters "INT." (FIG. 6A), corresponding to the intermediate state of the circuit breaker 2 and secondary disconnect assembly 200, shown in FIG. 6B, and the letters "CONN." (FIG. 7A), corresponding to the connected state of the circuit breaker 2 and secondary disconnect assembly 200, shown in FIG. 7B. It will, however, be appreciated that the secondary disconnect assembly 200 in accordance with the disclosed concept could be adapted to provide any known or suitable alternative type and/or number of indication corresponding to any known or suitable number of alternative and/or additional circuit breaker and secondary disconnect assembly positions.

As shown in FIGS. 4B, 5B, 6B and 7B, the example position indicator 240 is operatively coupled to the aforementioned pivotable lever member 222, by way of at least one elongated member 254. Thus, when the latching member 216 is latched and the sliding member 214 and the circuit breaker 2 move, the pivotable lever member 222 correspondingly moves. This, in turn, moves the elongated member 254 and finally the position indicator 240 to provide the desired visual indication of the position of the circuit breaker 2 with respect to the switchgear enclosure 300 (FIG. 1). More specifically, the mounting assembly 202 preferably includes a linkage assembly 250, such as the elongated members 254,256, and linking member 258, best shown in the isometric view of FIG. 3. In addition, the mounting assembly 202 preferably includes a plurality of biasing elements, such as for example and without limitation, first spring 260, also shown in FIG. 3 (see also FIGS. 4B, 5B, 6B and 7B). The linkage assembly 250 couples the pivotable lever member 222 to the position indicator 240, and the biasing element 260 biases the elongated member 254 to control the position indicator 240, as desired.

Specifically, the bracket member 250 extends from the first side 206 of the elongated mounting member 204 of the mounting assembly 202 toward the second side 208 of the elongated mounting member 204, as best shown with reference to the top and bottom isometric views of FIGS. 2 and 3. The example linking assembly 250 includes first and second elongated members 254,256, which extend, side-by-side, from proximate the position indicator 240 at or about the first end 206 of the elongated mounting member 204 toward the second end 208 of the elongated mounting member 204. The linking member 258 couples the position indicator 240 to a corresponding one of the elongated members 254, as shown in FIG. 3. Finally, the elongated members 254,256 are suitably coupled to the lever member 222 in order that movement of the sliding assembly 214 and, in particular, the aforementioned lever control member 223, into contact with the pivotable lever member 222, moves the pivotable lever member 222, thereby moving the linkage assembly 250 and ultimately the position indicator 240 (e.g., in the direction of arrow 800 of FIG. 2).

As shown in FIG. 3, the spring 260 connects the elongated member 254 to the second side 212 of the elongated mounting member 204 in order to bias the elongated member 254 toward the second end 206 of the elongated mounting member 204. This, in turn, biases the pivotable lever member 222 and the locking member 230 toward the locked position, as previously described. It will, however, be appreciated that any known or suitable alternative number of springs or other suitable biasing elements (not shown) and/or configuration of elongated members or other suitable linking elements (not shown) could be employed, without departing from the scope of the disclosed concept.

As shown in FIG. 5B, a push-pull cable 290 can be connected to the secondary disconnect assembly 200, in order to accommodate extended motion or travel (e.g., without limitation, up to 10 inches or more) of the circuit breaker 2 with respect to the switchgear enclosure 300 (FIG. 1) while enabling the position indicator 240 to be disposed at a remote location (e.g., without limitation, toward the front of the circuit breaker 2). For example and without limitation, the position indicator 240 can be viewed through a window 14 at this location, as shown in FIG. 1. More specifically, in one non-limiting embodiment, one end of the push-pull cable 290 (partially shown in FIG. 5B) can be connected to the first elongated member 254 of the linkage assembly 250 at or about a corresponding hole 292 of the first elongated member 254, and the second end can be connected to a corresponding portion of the switchgear enclosure 300 (FIG. 1). In this manner, the push-pull cable 290 will function to mechanically translate movement of the secondary disconnect assembly 200 with respect to the switchgear enclosure 300 (FIG. 1) into a corresponding desired movement of the position indicator 240.

Accordingly, the disclosed racking assembly 100 and secondary disconnect assembly 200 therefor provide an affective mechanism for combining the automatic secondary disconnect of a circuit breaker 2, or other suitable electrical switching apparatus (not shown), with a position indicator 240 in a way that ensures the actual position of the circuit breaker 2 is being accurately indicated as opposed to only indicating the position of the racking assembly 100.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A secondary disconnect assembly for a racking assembly of an electrical switching apparatus, said racking assembly movably coupling said electrical switching apparatus to a switchgear enclosure, said secondary disconnect assembly comprising:
   a mounting assembly structured to be coupled to said racking assembly, said mounting assembly comprising an elongated mounting member including a first end, a second end disposed opposite and distal from the first end, a first side, and a second side disposed opposite the first side;
   a sliding assembly movably coupled to the first side between the first end and the second end; and
   a latching member pivotably coupled to said sliding assembly, said latching member being structured to move between an unlatched position corresponding to said electrical switching apparatus being movable independently with respect to said sliding assembly, and a latched position corresponding to said latching member fixedly coupling said sliding assembly to said electrical switching apparatus in order that said electrical switching apparatus moves with said sliding assembly,
   wherein said mounting assembly further comprises a lever member; wherein said sliding assembly comprises a locking member; wherein said locking member includes a first portion and a second portion; wherein the first portion cooperates with said latching member; wherein the second portion cooperates with said elongated mounting member; wherein said locking member is movable between a locked position corresponding to the second portion locking with the elongated mounting member in order that said sliding assembly cannot move with respect to said mounting assembly, and an unlocked position corresponding to the second portion of said locking member disengaging said elongated mounting member in order that said sliding assembly is movable with respect to said mounting assembly; and wherein said locking member is disposed in said locked position unless and until said latching member is disposed in said latched position, and
   wherein said mounting assembly further comprises a position indicator; wherein said position indicator is operatively coupled to said lever member; and wherein, when said latching member is latched and said sliding member and said electrical switching apparatus move, said lever member is structured to correspondingly move, thereby moving said position indicator to provide a visual indication of the position of electrical switching apparatus with respect to said enclosure.

2. The secondary disconnect assembly of claim 1 wherein said electrical switching apparatus includes a protrusion; wherein said latching member includes a cam surface and a recess; wherein said cam surface is structured to engage said protrusion, thereby pivoting said latching member toward said latched position; and wherein, when said latching member is disposed in said latched position, said recess is structured to receive said protrusion, thereby fixedly coupling said sliding assembly to said electrical switching apparatus.

3. The secondary disconnect assembly of claim 1 wherein said locking member is at least one locking pin; and wherein said at least one locking pin is biased toward said locked position.

4. The secondary disconnect assembly of claim 1 wherein said mounting assembly further comprises a linkage assembly and a number of biasing elements; and wherein said linkage assembly couples said lever member to said position indicator.

5. The secondary disconnect assembly of claim 4 wherein said linkage assembly comprises a number of elongated members and a linking member; wherein said elongated members extend from proximate said position indicator at or about the first end of said elongated mounting member toward the second end of said elongated mounting member; wherein said linking member couples said position indicator to a corresponding one of said elongated members; and wherein said elongated members are coupled to said lever member, in order that movement of said elongated member moves said lever member and said position indicator.

6. The secondary disconnect assembly of claim 5 wherein said number of biasing elements is a spring; and wherein said spring connects said elongated member to said elongated mounting member.

7. The secondary disconnect assembly of claim 5 wherein said number of elongated members comprises a first elongated member and a second elongated member disposed beside said first elongated member, wherein said first elongated member includes a tab; and wherein said linking member connects said tab of said first elongated member to said position indicator.

8. The secondary disconnect assembly of claim 5 wherein said mounting assembly further comprises a push-pull cable; and wherein said push-pull cable is structured to connect a corresponding one of said elongated members to said switch ear enclosure.

9. A racking assembly for an electrical switching apparatus, said racking assembly comprising:
   a number of rails structured to movably couple said electrical switching apparatus to a switchgear enclosure; and
   a secondary disconnect assembly comprising:
      a mounting assembly coupled to said rails, said mounting assembly comprising an elongated mounting member including a first end, a second end disposed opposite and distal from the first end, a first side, and a second side disposed opposite the first side,
      a sliding assembly movably coupled to the first side between the first end and the second end, and
      a latching member pivotably coupled to said sliding assembly, said latching member being structured to move between an unlatched position corresponding to said electrical switching apparatus being movable independently with respect to said sliding assembly, and a latched position corresponding to said latching member fixedly coupling said sliding assembly to said electrical switching apparatus in order that said electrical switching apparatus moves with said sliding assembly,
      wherein said mounting assembly further comprises a lever member; wherein said sliding assembly comprises a locking member; wherein said locking member includes a first portion and a second portion; wherein the first portion cooperates with said latching member; wherein the second portion cooperates with said lever member; wherein said locking member is movable between a locked position corresponding to the second portion locking with the elongated mounting member in order that said sliding assembly cannot move with respect to said mounting assembly, and an unlocked position corresponding to the second portion of said locking member disengaging said elongated mounting member in order that said sliding assembly is movable with respect to said mounting assembly; and wherein said locking member is disposed in said locked position unless and until said latching member is disposed in said latched position, and wherein said mounting assembly further comprises a position indicator; wherein said position indicator is operatively coupled to said lever member; and wherein, when said latching member is latched and said sliding member and said electrical switching apparatus move, said lever member is structured to correspondingly move, thereby moving said position indicator to provide a visual indication of the position of electrical switching apparatus with respect to said enclosure.

10. The racking assembly of claim 9 wherein said electrical switching apparatus includes a protrusion; wherein said latching member includes a cam surface and a recess; wherein said cam surface is structured to engage said protrusion, thereby pivoting said latching member toward said latched position; and wherein, when said latching member is disposed in said latched position, said recess is structured to receive said protrusion, thereby fixedly coupling said sliding assembly to said electrical switching apparatus.

11. The racking assembly of claim 9 wherein said mounting assembly further comprises a linkage assembly and a number of biasing elements; wherein said linkage assembly comprises a number of elongated members and a linking member; wherein said elongated members extend from proximate said position indicator at or about the first end of said elongated mounting member toward the second end of said elongated mounting member, wherein said linking member couples said position indicator to a corresponding one of said elongated members; wherein said elongated members are coupled to said lever member, in order that movement of said elongated member moves said lever member and said position indicator; wherein said number of biasing elements is a spring; and wherein said spring connects said elongated member to said elongated mounting member.

12. An electrical switching apparatus comprising:
a housing including a first side, a second side disposed opposite the first side, and a base extending between the first side and the second side; and
a racking assembly structured to movably couple said electrical switching apparatus to a switchgear enclosure, said racking assembly comprising:
a pair of rails movably coupling the first and second sides of the housing to said switchgear enclosure, and
a secondary disconnect assembly comprising:
a mounting assembly coupled to said rails, said mounting assembly comprising an elongated mounting member including a first end, a second end disposed opposite and distal from the first end, a first side, and a second side disposed opposite the first side,
a sliding assembly movably coupled to the first side between the first end and the second end, and
a latching member pivotably coupled to said sliding assembly, said latching member moving between an unlatched position corresponding to said electrical switching apparatus being movable independently with respect to said sliding assembly, and a latched position corresponding to said latching member fixedly coupling said sliding assembly to said electrical switching apparatus in order that said electrical switching apparatus moves with said sliding assembly, wherein said mounting assembly further comprises a lever member; wherein said sliding assembly comprises a locking member; wherein said locking member includes a first portion and a second portion; wherein the first portion cooperates with said latching member; wherein the second portion cooperates with said elongated mounting member; wherein said locking member is movable between a locked position corresponding to the second portion locking with the elongated mounting member in order that said sliding assembly cannot move with respect to said mounting assembly, and an unlocked position corresponding to the second portion of said locking member disengaging said elongated mounting member in order that said sliding assembly is movable with respect to said mounting assembly; and wherein said locking member is disposed in said locked position unless and until said latching member is disposed in said latched position, and wherein said mounting assembly further comprises a position indicator; wherein said position indicator is operatively coupled to said lever member; and wherein, when said latching member is latched and said sliding member moves, said lever member moves correspondingly, thereby moving said position indicator to provide a visual indication of the position of electrical switching apparatus with respect to said switchgear enclosure.

13. An electrical switching apparatus comprising:
a housing including a first side, a second side disposed opposite the first side, and a base extending between the first side and the second side; and
a racking assembly structured to movably couple said electrical switching apparatus to switchgear enclosure, said racking assembly comprising:
a pair of rails movably coupling the first and second sides of the housing to said switchgear enclosure, and
a secondary disconnect assembly comprising:
a mounting assembly coupled to said rails, said mounting assembly comprising an elongated mounting member including a first end, a second end disposed opposite and distal from the first end, a first side, and a second side disposed opposite the first side,
a sliding assembly movably coupled to the first side between the first end and the second end, and
a latching member pivotably coupled to said sliding assembly, said latching member moving between an unlatched position corresponding to said electrical switching apparatus being movable independently with respect to said sliding assembly, and a latched position corresponding to said latching member fixedly coupling said sliding assembly to said electrical switching apparatus in order that said electrical switching apparatus moves with said sliding assembly, and wherein said electrical switching apparatus includes a protrusion extending outwardly from said base of the housing; wherein said latching member includes a cam surface and a recess; wherein said cam surface engages said protrusion, thereby pivoting said latching member toward said latched position; and wherein, when said latching member is disposed in said latched position, said protrusion is disposed in said recess, thereby fixedly coupling said sliding assembly to said electrical switching apparatus.

14. The electrical switching apparatus of claim 12 wherein said mounting assembly further comprises a linkage assembly and a number of biasing elements; wherein said linkage assembly comprises a number of elongated members and a linking member, wherein said elongated members extend from proximate said position indicator at or about the first end of said elongated mounting member toward the second end of said elongated mounting member; wherein said linking member couples said position indicator to a corresponding one of said elongated members; wherein said elongated members are coupled to said lever member, in order that movement of said elongated member moves said lever member and said position indicator; wherein said number of biasing elements is a spring; and wherein said spring connects said elongated member to said elongated mounting member.

* * * * *